I. H. GRIFFITHS.
GUN MOUNTING.
APPLICATION FILED AUG. 2, 1918.
1,394,083.
Patented Oct. 18, 1921.
2 SHEETS—SHEET 2.
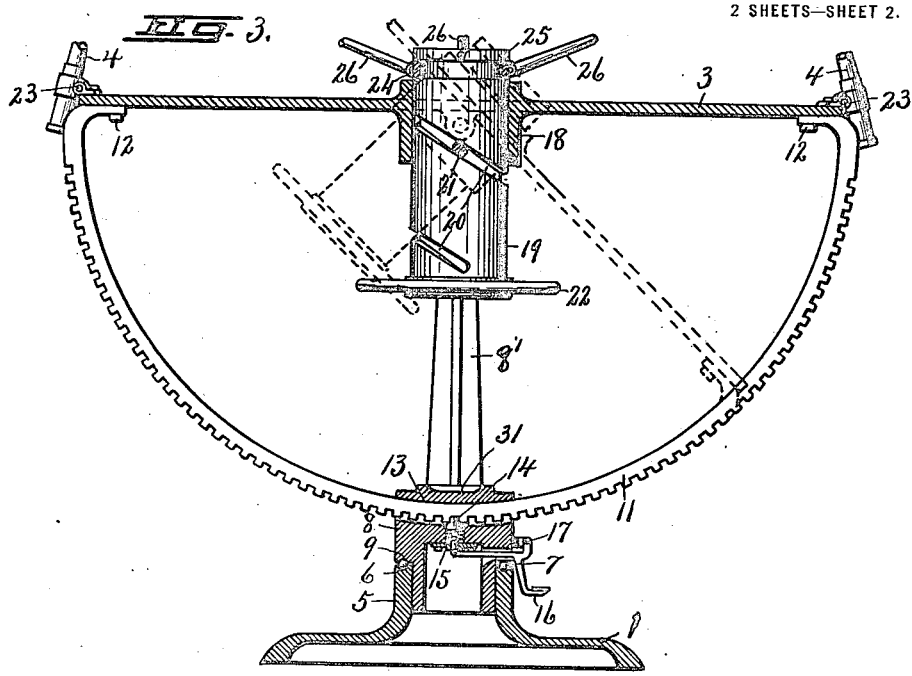
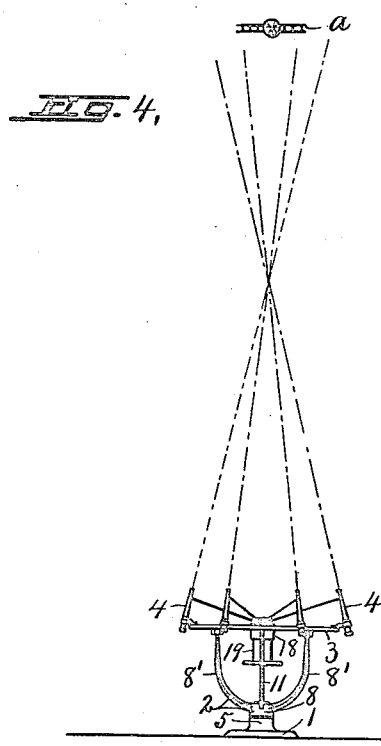

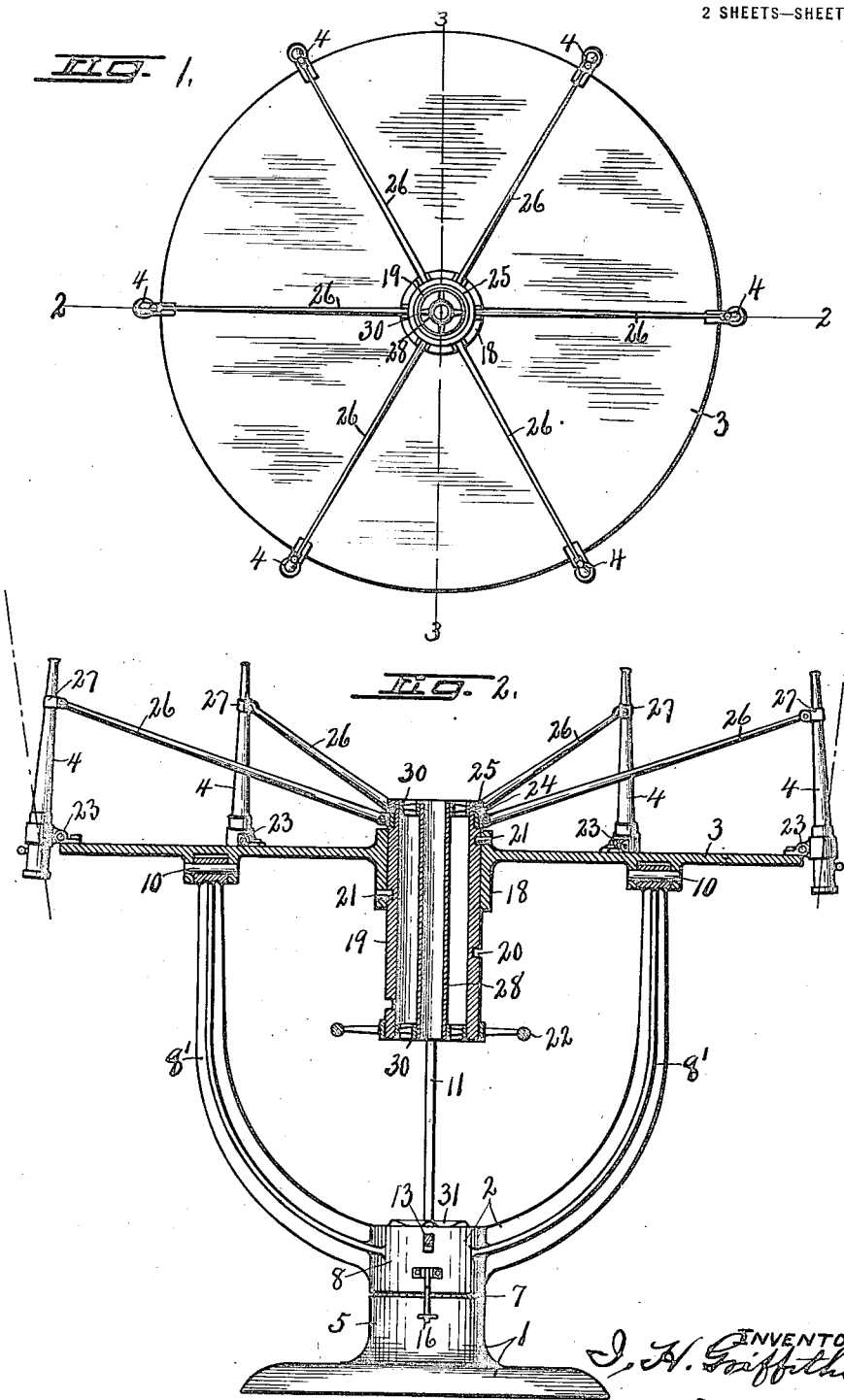

ns of a gun mounting embodying the various features of my invention.
UNITED STATES PATENT OFFICE.

IRA HERMAN GRIFFITHS, OF SYRACUSE, NEW YORK.

GUN-MOUNTING.

1,394,083.  Specification of Letters Patent.  Patented Oct. 18, 1921.

Application filed August 2, 1918. Serial No. 247,914.

*To all whom it may concern:*

Be it known that I, IRA H. GRIFFITHS, a citizen of the United States of America, of Syracuse, in the county of Onondaga, in the State of New York, have invented new and useful Improvements in Gun-Mountings, of which the following, taken in connection with the accompanying drawings, is a full, clear, and exact description.

This invention relates to certain improvements in gun mountings adapted to be used as an implement of warfare for projectile attack upon various forms of aircraft.

The main object is to mount the guns in such a manner that the bullets, shells or other projectiles may be projected upwardly in converging, diverging or parallel lines about a common vertical axis so as to cover a relatively wide field in which the aircraft may be moving and thereby to greatly increase the destructive possibilities by the simultaneous discharge of the guns when desired.

Another object is to provide simple, practical and efficient means whereby the gun carriage may be easily and quickly adjusted rotarily or tilted relatively to said axis so that the operator may readily change the field of discharge of the projectiles according to the position of the aircraft.

A further object is to provide the gun mounting with a co-axial sight-tube or periscope whereby the operator is enabled to visually locate the position of the aircraft and to direct the guns to the field in which it is moving.

Other objects and uses relating to specific parts of the apparatus will be brought out in the following description.

In the drawings—

Figure 1 is a top plan of a gun mounting embodying the various features of my invention.

Figs. 2 and 3 are vertical sectional views taken respectively, on lines 2—2 and 3—3 Fig. 1, portions of the guns and their connecting links with the central adjusting sleeve being broken away in Fig. 3, the dotted lines in Fig. 2 indicating the different angles of adjustment of the guns.

Fig. 4 is a side elevation on reduced scale of the apparatus shown in Fig. 1 in which the dotted lines indicate the intersecting paths of movement of the projectiles when the guns are set in one position.

This gun mounting is adapted to be placed upon any stationary or movable support such for example as the roofs of buildings, the decks of ships, the platforms or roofs of cars and other places where a device of this character might be useful and comprises a supporting base —1— upon which is mounted a revoluble, upright frame —2— carrying at its upper end a tiltable table or gun support —3— for receiving and supporting a series of, in this instance six guns —4—, the latter being also hingedly mounted upon the table —3— and adapted to be adjusted simultaneously in a manner hereinafter described.

As illustrated the base —1— is provided with a central upright tubular hub —5— having on its upper end a concentric ball race —6— for receiving a circular series of antifriction balls —7—, as shown more clearly in Fig. 3.

The upper frame —2— is substantially Y-shaped and consists of a central hub —8— and opposite upwardly extending arms —8¹— symmetrically disposed with reference to the axis of said hub.

The lower end of the hub —8— is reduced in diameter and is journaled in the hub —5— of the base —1— thus forming an annular shoulder —9— resting upon the balls —7— which together with the reduced lower end of the hub —8— serve to hold the frame —2— in a vertical position and to permit it to be easily revolved about its axis together with the table —3— and guns —4— mounted thereon.

The table —3— is preferably circular and of any suitable diameter and is pivotally mounted at —10— upon the upper ends of the arms —8¹— to tilt laterally in opposite directions to and from a horizontal plane, the pivots —10— being disposed at right angles to the axis of revolution of the frame —2— equal distances from and at opposite sides of said axis in the same vertical plane thereof so that when the table is in a horizontal position, its vertical axis is coaxial with the axis of revolution of the frame —2—.

Suitable means is provided for adjusting the table —3— about the axis of its pivot —10— and for holding said table in its adjusted position, said means consisting in this instance of a substantially semi-circular toothed rack —11— disposed in the vertical plane of the axis of the revolution of frame —2— at right angles to the axis of pivots —10— and having its ends secured by bolts —12— to diametrically opposite sides of the table —3— equal distances from the vertical axis thereof, said segment being arched downwardly from its ends and passed through a guideway or opening —13— in the hub —8— of the frame —2— whereby the table is steadied in its tilting movement.

A packing bolt —14— is movable in a central axial opening in the hub —8— into and out of engagement with the teeth of the segment —11— to hold said segment and table in their adjusted positions and is forced to its locking position by spring —15— (Fig. 3), but may be withdrawn from its locking position against the action of said spring by means of pedal or hand lever —16— which is pivoted at —17— to the hub —8— and has a portion thereof extending through a radial opening in said hub and pivotally connected to the lower end of the bolt —14—.

The table —3— is provided with a central tubular hub —18— in which is revolubly mounted an upright co-axial sleeve —19— extending some distance above and below the corresponding ends of hub —18— and being provided with a peripheral spiral groove —20— of relatively steep pitch for receiving a radial stud —21— on the hub —18— of the table whereby the rotation of the sleeve —19— will move it axially, the lower end of said sleeve being provided with a hand-wheel —22— by which it may be rotated.

The guns 4 may be of any desired construction but are preferably of the automatic machine type and are pivotally mounted at —23— upon the marginal edge of the table —3— in uniformly spaced relation circumferentially so as to swing vertically in planes radial to the axis of revolution of the table.

The upper end of the screw-sleeve —19— above the table —3— is also reduced in diameter and upon this reduced end is mounted a collar —24— which is held in place by a lock-nut —25— engaging the end of the sleeve just above the collar to hold the collar against axial displacement and permit relative rotation of said sleeve and collar.

The upper portions of the several guns are connected by separate links —26— to the collar or ring —24—, said links being preferably disposed in radial lines and in inclined planes, the ends thereof being pivotally connected to the ring —24— and to suitable clamps —27— on the guns whereby when the sleeve —19— is moved axially by the rotation thereof, the guns will be simultaneously tilted or adjusted to approximately equal angles with reference to the plane of table —3—.

As illustrated the guns may be adjusted about the axis of their respective pivots to vertical positions or to different angles at opposite sides thereof along radial planes to permit the projectiles to be directed upwardly in either converging or diverging paths, thus permitting all the projectiles to be concentrated upon an aerial target such as an air craft or spread out over fields of widely different areas as indicated by the dotted lines in Fig. 4 in which a miniature aeroplane —a— is shown diagrammatically in said field.

The sleeve —19— is open from end to end and may constitute a sight-tube through which the aerial object may be viewed or, if necessary or desirable, I may use a supplementary sight-tube —28— which, in this instance, extends entirely through the sleeve —19— coaxial therewith and is supported at its ends by suitable heads —30— having alined openings therethrough to permit the target to be seen around the central sight-tube.

The upper end of the hub —8— of the frame —2— may constitute a seat or stand —31— upon which the operator may rest while sighting through the tube —28— or sleeve —19— in which position the operator may readily trip the pawl —14— by outward and upward movement of the free end of the lever —16— whereupon the table —3— may be tilted upon its pivots —10— by angular movement of the sleeve —19— through the medium of the hand-wheel —22— or from the same position, the sleeve may be rotated by said hand-wheel to adjust the guns —4— to the desired angle.

It is evident however that the position of the operator is immaterial except that he should be in a position to make the various adjustments of the table both rotarily and at an angle to the axis of rotation and also to adjust the guns while sighting through the tube —28— or sleeve —19—.

These adjustments not only enable the operator to direct the guns to follow the movements of aircraft but also permit the projectiles to be fired into a relatively small or large field and thereby concentrated upon or entirely around the object or target during which the frame —2— with the gun supporting table thereon may be revolved in one direction or the other and tilted to cover practically the entire field with the projectiles.

What I claim is:

In a gun mounting, the combination of a base, a frame journaled on the base to rotate about a vertical axis and provided with means for supporting an attendant near said axis, a gun carrier hinged to the frame to swing about a horizontal axis, means for locking said carrier in different positions of adjustment about said horizontal axis, a sighting tube mounted on the carrier to swing therewith to and from a position coaxial with said vertical axis, a plurality of guns pivotally mounted on the carrier in uniformly spaced relation circumferentially around the sighting tube to swing toward and from the axis of said sighting tube, and means for adjusting said guns about the axis of their respective pivots.

In witness whereof I have hereunto set my hand this 25th day of July 1918.

IRA HERMAN GRIFFITHS.

Witnesses:
H. E. CHASE,
E. M. WILLIAMS.